United States Patent [19]

Martin et al.

[11] 4,334,447

[45] Jun. 15, 1982

[54] CUTTER ASSEMBLY FOR DOUGH STRIPS

[75] Inventors: William E. Martin; Harold E. Sumrall, both of Caldwell, Id.

[73] Assignee: J. R. Simplot Company, Boise, Id.

[21] Appl. No.: 157,251

[22] Filed: Jun. 9, 1980

[51] Int. Cl.³ .......................... A21C 5/00; B26D 3/20
[52] U.S. Cl. .................................... 83/111; 83/356.3; 83/620; 83/630; 83/697
[58] Field of Search ................. 83/618, 1, 622, 356.3, 83/697, 630, 111

[56] References Cited

U.S. PATENT DOCUMENTS

| | | | |
|---|---|---|---|
| 3,263,539 | 8/1966 | Daniel et al. | 83/620 X |
| 3,416,396 | 12/1968 | Donner | 83/620 X |
| 3,530,748 | 9/1970 | Fuller | 83/620 X |

Primary Examiner—Frank T. Yost
Attorney, Agent, or Firm—Fulwider, Patton, Rieber, Lee & Utecht

[57] ABSTRACT

A cutter assembly is provided for cutting continuous strips of a dough product, such as potato dough, into a plurality of relatively short strip segments with a variety of lengths and angular end cuts.

14 Claims, 4 Drawing Figures

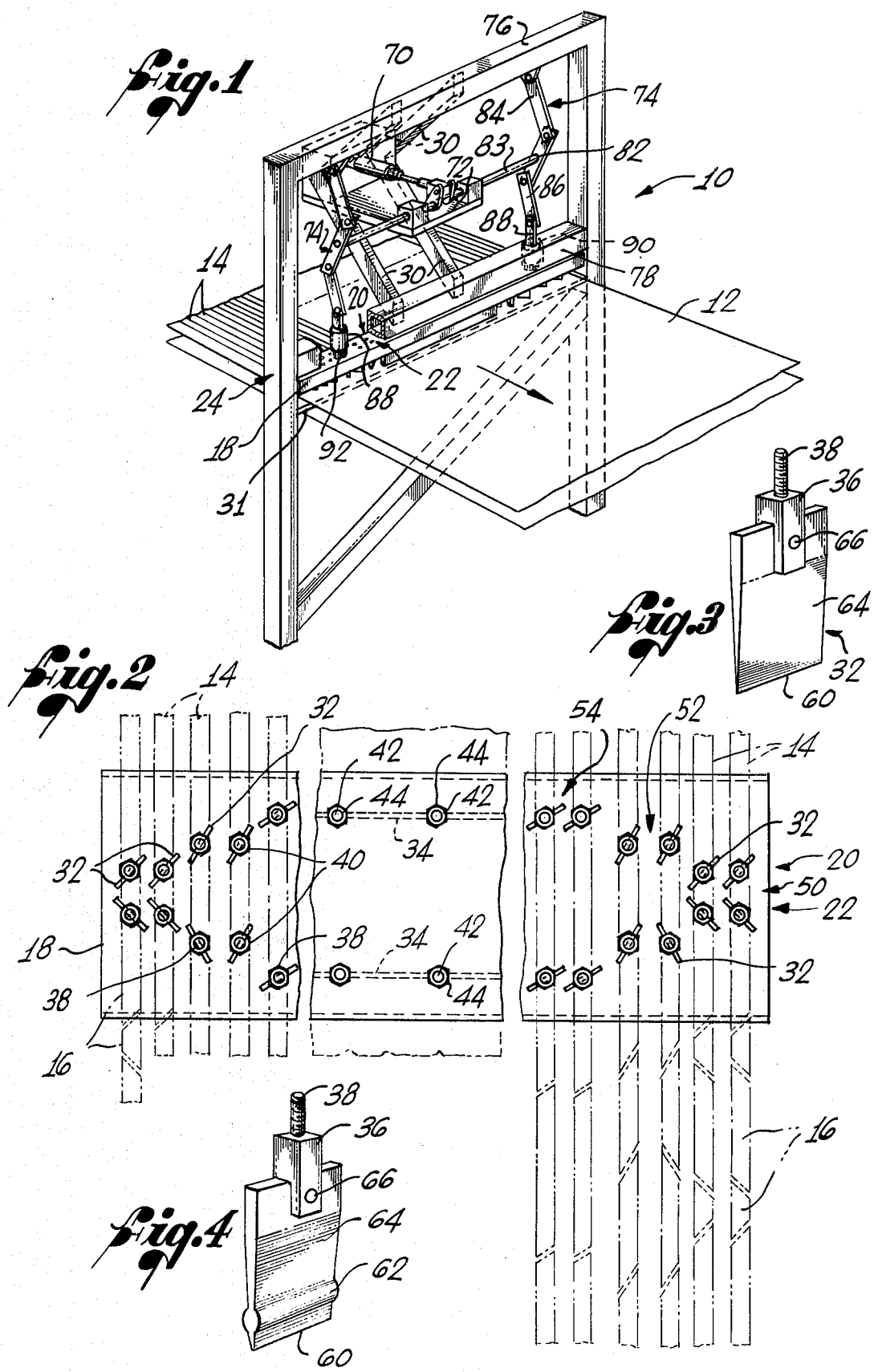

CUTTER ASSEMBLY FOR DOUGH STRIPS

BACKGROUND OF THE INVENTION

This invention relates to a cutter assembly for cutting strips of potato dough and the like into relatively short strip segments. More specifically, this invention relates to an improved cutter assembly for cutting the dough strips into segments having a predetermined variety of selected lengths, and a predetermined variety of selected angular end cuts.

French fried potatoes comprise a popular consumer food item, and are commonly sold in the form of frozen strips of parfried natural potato for finish cooking by the purchaser prior to consumption. Strips of natural potato, however, must be formed without traces of peel and dark spots for proper consumer acceptance. Accordingly, in the formation of natural potato strips for French frying, a substantial portion of the potato is wasted to assure removal of peel and dark spots. This waste results in a relatively high cost of the product to the consumer.

It is therefore desirable to provide parfried potato strips formed from a potato-based dough, and thereby allow for a more complete and economical use of the natural potato incorporated into the dough. To this end, it is desirable to convert a mass of potato dough into a plurality of dough strips which are then cut into short strip segments to simulate a natural potato product. However, prior art cutting apparatus has been designed to cut the dough strips into a plurality of identical strips lengths. This results in an unnatural product appearance since, of course, natural potato strips are formed to have a variety of strips lengths having their ends cut at a variety of different angles. It is desirable, therefore, to provide a cutter assembly for cutting strips of potato dough into strip segments which more closely simulate strips of natural potato.

The present invention provides an improved cutter assembly for cutting a plurality of potato dough strips into strip segments having a plurality of different strip lengths with their ends cut at a plurality of different angles.

SUMMARY OF THE INVENTION

In accordance with the invention, a cutter assembly is provided for segmenting a plurality of parallel dough strips into relatively short strip segments having a predetermined plurality of different segment lengths with ends cut at a plurality of different angles. The dough strips are transported by a conveyor belt from an appropriate dough shaper device toward the cutter assembly for segmenting of the strips. The strip segments are then transported further by the conveyor belt from the cutter assembly for subsequent processing such as parfrying or the like.

The cutter assembly comprises a cutter blade mounting plate carried above the conveyor belt by a support frame. At least two rows of cutter blades are mounted on the plate to extend transversely the width of the conveyor belt and to project downwardly toward the dough strips. A timed drive mechanism sequentially strokes the mounting plate downwardly with respect to the support frame to bring the cutter blades into cutting engagement with the dough strips.

In a preferred embodiment, each row of cutter blades includes a plurality of relatively small blades each sized for cutting engagement with a single strip of potato dough, and aligned with a similarly-sized blade of the other row for cutting engagement with the same dough strip. These aligned pairs of relatively small blades are spaced from each other at different distances to provide cut dough segments having different lengths and are angularly set at different angles with respect to the direction of motion of the strips to provide dough segments with ends cut at different angles. For example, the various pairs of blades can be angled to cut strips with identical end angles, complementary end angles or any other set of end angles.

In a preferred embodiment, each row of cutter blades also includes at least one relatively large blade sized for cutting engagement with a plurality of the dough strips. The large blades of the two rows are positioned to cut the dough strips at right angles with respect to the direction of motion of the strips, and may be aligned with each other for cutting engagement with the same dough strips. Accordingly, with the combined effect of the pairs of small blades and the large blades, cut dough segments are provided having a large variety of lengths and end cuts to thus simulate potato stips as would be obtained by cutting natural potatoes.

BRIEF DESCRIPTION OF THE DRAWINGS

The accompanying drawings illustrate the invention. In such drawings:

FIG. 1 is a fragmented perspective view illustrating a cutter assembly of this invention for cutting engagement with a plurality of potato dough strips;

FIG. 2 is a fragmented enlarged top plan view of the cutter assembly of this invention;

FIG. 3 is an enlarged perspective view illustrating a preferred cutter blade configuration; and FIG. 4 is an enlarged perspective view illustrating an alternate cutter blade configuration.

DETAILED DESCRIPTION OF THE PREFERRED EMBODIMENT

A cutter assembly 10 of this invention is shown generally in FIG. 1 in relation to a conveyor belt 12 carrying a plurality of dough strips 14 formed from a potato base product. One example of such a potato base product is disclosed and described in U.S. patent application Ser. No. 157,257, filed June 9, 1980 in the name of Michael L. Hamann et al. These dough strips 14 may be suitably shaped from a dough mass as by an extrusion process, or by any other suitable dough-forming method. For example, a preferred rotary shaping process is disclosed and described in U.S. patent application Ser. No. 157,252 filed concurrently herewith in the name of Michael L. Hamann et al. The dough strips 14 are transported by the conveyor belt 12 toward interaction with the cutter assembly 10 whereby the cutter assembly operates through a series of cutting strokes to sever the strips 14 into a plurality of relatively short strip segments 16. These strip segments 16 are cut as will be described herein to closely simulate natural potato strips for subsequent processing such as parfrying or the like.

As shown in FIG. 1, the cutter assembly 10 comprises a cutter blade mounting plate 18 positioned above the conveyor belt 12 to extend transversely the width of the conveyor belt. The mounting plate 18 supports two rows 20 and 22 of cutter blades which project downwardly toward the dough strips 14 on the conveyor belt 12. The mounting plate 18 is movably carried with respect to a support frame 24, and is sequentially stroked downwardly by a suitable timed drive mechanism.

One example of a timed drive mechanism is illustrated in FIG. 1, and comprises a pneumatically-powered ram 70 supported on a platform 72 above the conveyor belt 12 to operate a scissors-type dual linkage 74 for stroking the rows 20 and 22 of blades into cutting engagement with the dough strips 14 to sever the strips and thereby form the strip segments 16. More specifically, a pair of support beams 76 and 78 forming part of the support frame 24 extend transversely over the conveyor belt 12 in vertically spaced relation therewith. A pair of V-shaped frame members 30 are attached to the beams 76 and 78 to provide support for the platform 72 carrying the ram 70. The free end of the ram 70 is pivotally attached to rotate a horizontal shaft 83 to which are connected a pair of centrally pivotal center frame links 82. An upper link 84 is pivotally secured between the upper support beam 76 and the upper end of each center link 82, and a lower link 86 is pivotally secured between the lower end of each center link 82 and an associated carrier bar 88. The carrier bars 88 extend vertically downwardly through guide slots 90 in the fixed lower support beam 78 for attachment to respective mounting brackets 92 projecting upwardly from the mounting plate 18.

The scissors-type linkage 74 is operable to stroke the rows 20 and 22 of the blades rapidly into and out of the dough strips 12. For example, motion of the ram 70 in one direction causes the links 82, 84 and 86 to vertically align with each other to rapidly stroke the mounting plate 18 downwardly, and then back upwardly as the links 82, 84 and 86 move past the vertically aligned configuration. Thus each stroke of the ram 70 moves the rows 20 and 22 of the cutter blades into, through, and back out of the dough strips. Conveniently, as illustrated in FIG. 1, a rigid base plate 30 can be supported by the frame 24 to extend transversely beneath the conveyor belt 12 in alignment with the blade rows 20 and 22 to provide a solid cutting base. Of course, the stroking motion of the blade rows is chosen to assure proper cutting of the dough strips 14 without damaging the conveyor belt 12.

As shown in FIG. 2, the two rows 20 and 22 of cutter blades extend transversely for the width of the mounting plate 18. More specifically, each row 20 and 22 of cutter blades includes a plurality of relatively small blades 32 generally in equal numbers at opposite ends of the row, and at least one relatively large or wide blade 34 disposed in the center of the row. As illustrated in FIG. 3, each of the relatively small blades 32 is carried by a mounting post 36 or other suitable fastener including a vertically extending threaded stud 38. The stud 38 is received upwardly through a mounting hole in the mounting plate 18, and the blade 32 is fixed in position by a nut 40 tightened over the stud 38. Importantly, as shown in FIG. 2, the angular setting of the small blades 32 with respect to the direction of travel of the dough strips 14 on the conveyor belt 12 is selectively chosen by rotation of their associated studs 38 with respect to the mounting plate 18 prior to tightening of the nut 40.

The large blades 34 of the cutter blade rows 20 and 22 can be secured to the mounting plate 18 in a similar manner. That is, similar mounting posts for the large blades 34 can be formed to include vertically extending threaded studs 42 received through aligned mounting holes in the mounting plate 18. The large blades 34 are fixed with respect to the mounting plate by means of nuts 44 secured over the upper ends of the studs 42. Conveniently, the provision of the large blades 34 at the center of the rows provides a substantially balanced dynamic assembly without requiring any detailed dynamic balancing of the structure.

Each of the relatively small cutter blades 32 is positioned and sized for cutting engagement with a single strip of the potato dough 14. Moreover, each of the small blades 32 of each row 20 and 22 is aligned with one of the small blades 32 of the other blade row disposed for cutting engagement with the same dough strip 14. Accordingly, upon downward stroking motion of the cutter assembly 10, each aligned pair of the small blades 32 operates to sever the associated dough strip 14 to form one of the strip segments 16. The opposite ends of the thus-formed strip segment 16 are angularly cut according to the angular setting of the blades 32 as described above. As illustrated in FIG. 2, it is desirable to position each aligned pair of the small blades 32 generally at a variety of different angles. Specifically, several of the pairs of small blades can be positioned to cut strip segments at the same angles, whereas others of the pairs of blades can be positioned to cut the ends of the strips at complementary angles.

The spacing between the aligned pairs of the small blades 32 is varied along the length of the mounting plate 18 to provide during operation a plurality of segments 16 of different lengths. That is, some of the aligned pairs of small blades 32 are positioned relatively close to each other as illustrated by the arrow 50 in FIG. 2. These closely positioned blade pairs will provide dough strip segments having an alternating long and short length when the assembly 10 is moved through regular cutting strokes. Other aligned pairs of the small blades are spaced somewhat further from each other as illustrated by arrow 52, to provide differently sized alternating long and short strip segments when the assembly is moved through regular cutting strokes. Still other aligned pairs of the small blades 32 are positioned still further apart, as illustrated at 54, to provide still another set of strip segments. Of course, the precise lengths of the various strip segments is dependent upon the particular relationship between the speed of the conveyor belt 12 and the stroking rate of the cutter assembly 10.

The relatively large blades 34 are each sized for engagement with more than one of the dough strips 14. As shown in FIG. 2, these large blades 34 of the two blade rows 20 and 22 are positioned parallel to each other and for cutting engagement with the same dough strips. Both of the large blades 34 extend generally transversely with respect to the direction of travel of the dough strips 14 and thereby operate to sever the strips to form segments 16 with square-cut ends. As in the case of the small blades 32, the lengths of the segments 16 formed by the large blades 34 is a result of the timed operation of the drive mechanism together with the relationship between the conveyor belt speed and the cutter assembly stroking rate.

A preferred blade contour for the cutter blades 32 and 34 is illustrated by way of example in FIG. 3, with one of the small blades 32 being shown. As shown, the blade 32 includes a cutting edge 60 blending upwardly into a flat blade shank 64 which is in turn secured as by a rivet 66 to the mounting post 36 including the threaded stud 38. In use, this blade may be coated with a suitable dough release agent such as a light coating of oil or the like, or alternately, the blade may be formed to have a stick-free surface layer such as Teflon or equivalent. Moreover, the blade can be alternately configured as illustrated in FIG. 4 to include a convexly contoured median portion 62 between the cutting edge 60 and the shank 64. This latter blade shaping is uniquely adapted to ensure relatively clean separation of adjacent ends of cut dough strip segments 16.

The cutter assembly 10 of this invention thus interacts with the dough strips 14 to form a plurality of strip segments 16 for subsequent processing. The timed drive mechanism is designed to sever the strips rapidly, and the drive mechanism shown has been found satisfactory to sever the stips with a time of contact between the cutter blades and the strips for each stroke less than about 0.02 seconds. This rapid cutting motion is desirable to avoid disturbance of the dough strips as they pass continuously along the conveyor belt, and to minimize sticking of the strips to blades. These strip segments are formed to have a plurality of different strip lengths having their ends cut at a variety of common, complementary, and other angles to closely simulate natural potato strips used in making French fries. Moreover, the provision of more than one row of cutter blades in the assembly 10 allows the cutting of both ends of a strip segment in a single cutting stroke to result in a high production of the segments for further processing.

A wide variety of modifications and improvements to the cutter assembly 10 of this invention are believed to be apparent to one skilled in the art. For example, multiple mounting plates 18 can be provided for supporting additional rows of cutter blades; or the two rows 20 and 22 of cutter blades can be supported upon different mounting plates which may be stroked together, or according to any other timing sequence. Still further, a variety of drive mechanisms may be used including other pneumatic or electric or hydraulic equipment or the like. If necessary, a stripper plate may be positioned over the dough strips for engagement with the cutter blades as the blades are retracted from the strips to prevent the dough strips from sticking to the blades. Accordingly, no limitation on the invention is intended, except as set forth in the appended claims.

What is claimed is:

1. A cutter assembly for cutting a plurality of parallel dough strips each into a plurality of relatively short strip segments, comprising:
   cutter blade mounting means for stroking motion toward and away from the dough strips; and
   at least two rows of cutter blades mounted on said blade mounting means extending toward the dough strips for cutting engagement therewith upon stroking motion of said blade mounting means toward the dough strips, each of said rows of cutter blades including a plurality of relatively small blades positioned and angularly set at different angles with respect to said blade mounting means for cutting the different ones of the dough strips to form strip segments with ends cut at a variety of different angles, each of said small blades of each row being aligned with one of said small blades of the other row to form a plurality of small blade pairs each for cutting engagment with a different one of the dough strips, and each of said rows of cutter blades further including a relatively large blade for cutting engagement with a plurality of the dough strips, said large blade of each row being aligned with said large blade of the other row for cutting engagement with the same dough strips.

2. The cutter assembly as set forth in claim 1 wherein said blade mounting means comprises a plate.

3. The cutter assembly as set forth in claim 1 wherein said relatively large blades of said two rows are disposed generally in parallel with each other.

4. The cutter assembly as set forth in claim 1 wherein said small blades of each of said small blade pairs are disposed from each other at a variety of different distances for forming the strip segments to have a variety of different lengths.

5. The cutter assembly as set forth in claim 1 wherein each of said small blades and said large blades includes means for reducing the tendency of the dough strips to stick to said blade.

6. The cutter assembly as set forth in claim 1 wherein each of said small blades and said large blades is shaped to have a cutting edge for cutting engagement with the dough strips, and convexly contoured median portion adjacent said cutting edge.

7. The cutter assembly as set forth in claim 1 including a support frame for supporting said blade mounting means generally above the dough strips, and a timed drive mechanism for sequentially stroking said blade mounting means toward and away from the dough strips.

8. A cutter assembly for cutting a plurality of parallel dough strips each into a plurality of relatively short strip segments, comprising:
   cutter blade mounting means for stroking motion toward and away from the dough strips; and
   at least two rows of cutter blades mounted on said blade mounting means and extending toward the dough strips for cutting engagement therewith upon stroking motion of said blade mounting means toward the dough strips, each of said rows of cutter blades including a plurality of relatively small blades positioned angularly with respect to said blade mounting means for cutting engagement with different ones of the dough strips to form strip segments with ends cut at a variety of different angles, each of said relatively small blades of each row being aligned with a relatively small blade of the other row to form a plurality of blade pairs each for engagement with a different one of the dough strips, said blades of said blade pairs being disposed from each other at a variety of different distances for forming the strip segments to have a variety of different lengths.

9. The cutter assembly as set forth in claim 8 wherein each of said rows further includes a relatively large blade for cutting engagement with a plurality of the dough strips, said large blade of each row being aligned with said large blade of the other row for cutting engagement with the same dough strips.

10. The cutter assembly as set forth in claim 8 wherein each of said blades is shaped to have a cutting edge for cutting engagement with the dough strips, and a convexly contoured median portion adjacent said cutting edge.

11. A cutter assembly for cutting a plurality of parallel dough strips each into a pluralty of relatively short strip segments; comprising:
   a cutter blade mounting plate;
   means for moving said plate through a stroking motion toward and away from the dough strips;

at least two rows of cutter blades mounted on said plate and extending toward the dough strips for cutting engagement therewith upon stroking motion of said plate toward the dough strips;

each of said rows of cutter blades including a plurality of relatively small blades positioned angularly with respect to said plate for cutting engagement with different ones of the dough strips to form strip segments with ends cut at a variety of different angles, each of said relatively small blades of each row being aligned with a relatively small blade of the other row to form a plurality of blade pairs each for cutting engagement with a different one of the dough strips, said blades of said blade pairs being disposed from each other at a variety of different distances for forming the strip segments to have a variety of different lengths; and each of said rows of cutter blades further including at least one relatively large blade for cutting engagement with a plurality of the dough strips, said relatively large blades of said rows being aligned with each other for cutting engagement with the same dough strips.

12. The cutter assembly as set forth in claim 11 wherein said relatively large blades of said two rows are disposed generally in parallel with each other.

13. The cutter assembly as set forth in claim 11 wherein each of said relatively small blades and said relatively large blades is shaped to have a cutting edge for cutting engagement with the dough strips, and a convexly contoured median portion adjacent said cutting edge.

14. A cutter assembly for stroking motion toward and away from a plurality of moving parallel dough strips for cutting the strips each into a plurality of relatively short strip segments, comprising:

cutter blade mounting means for stroking motion toward and away from the dough strips;

a first row of cutter blades mounted on said blade mounting means to extend toward the dough strips for cutting engagement therewith upon stroking motion of said blade mounting means toward the dough strips, said first row including a plurality of relatively small blades each for cutting engagement with a respective one of the dough strips and angularly positioned at a variety of different angles with respect to the direction of motion of the dough strips, and at least one relatively large blade for cutting engagement with a plurality of the dough strips; and a second row of cutter blades mounted on said blade mounting means in spaced relation with said first row to extend toward the dough strips for cutting engagement therewith upon stroking motion of said blade mounting means toward the dough strips, said second row including a plurality of relatively small blades each for cutting engagement with a respective one of the dough strips and angularly positioned at a variety of different angles with respect to the direction of motion of the dough strips, said small blades of said second row being aligned with respective ones of said small blades of said first row to form a plurality of blade pairs, said small blades of said blade pairs being spaced from each other at a variety of different distances, and further including at least one relatively large blade for cutting engagement with a plurality of the dough strips, said large blades of said first and second rows being aligned and positioned generally in parallel relation for cutting engagement with the same dough strips.

* * * * *